United States Patent [19]

Hirobe

[11] Patent Number: 5,061,016
[45] Date of Patent: Oct. 29, 1991

[54] BRAKE FLUID PRESSURE CONTROL APPARATUS

[75] Inventor: Yoshiaki Hirobe, Saitama, Japan

[73] Assignee: Akebono Brake Industry Co., Ltd., Japan

[21] Appl. No.: 456,176

[22] Filed: Dec. 26, 1989

[30] Foreign Application Priority Data

Dec. 28, 1988 [JP] Japan .............. 63-332365

[51] Int. Cl.⁵ .............................................. B60T 8/44
[52] U.S. Cl. ..................... 303/114 R; 60/555;
60/565; 188/358; 303/116 WP; 303/119 R; 303/92
[58] Field of Search ........... 60/545, 555, 556, 557, 60/558, 559, 562, 560, 565, 566; 303/92, 100, 113, 114, 116, 50–56, 119; 188/358, 359; 91/460

[56] References Cited

U.S. PATENT DOCUMENTS

| | | | |
|---|---|---|---|
| 3,640,067 | 2/1972 | Ingram | 60/579 X |
| 3,661,427 | 5/1972 | Hodge | 303/116 |
| 4,438,629 | 3/1984 | Sato et al. | 60/579 |
| 4,449,369 | 5/1984 | Dauvergne | 60/556 |
| 4,651,528 | 3/1987 | Carre et al. | 60/556 |
| 4,671,168 | 6/1987 | Sauvee et al. | 91/460 X |
| 4,709,550 | 12/1987 | Sauvee et al. | 91/460 X |
| 4,750,789 | 6/1988 | Belart et al. | 303/114 |
| 4,787,685 | 11/1988 | Klein | 60/555 X |
| 4,798,127 | 1/1989 | Levrai et al. | 91/460 X |
| 4,802,713 | 2/1989 | Ogino | 303/119 |
| 4,838,621 | 6/1989 | Furuta et al. | 303/114 X |
| 4,858,737 | 8/1989 | Tourneur et al. | 60/565 X |
| 4,902,075 | 2/1990 | Uno et al. | 60/555 X |

FOREIGN PATENT DOCUMENTS

| | | |
|---|---|---|
| 59-137242 | 8/1984 | Japan . |
| 61-77553 | 4/1986 | Japan . |
| 61-81260 | 4/1986 | Japan . |

*Primary Examiner*—Douglas C. Butler
*Attorney, Agent, or Firm*—Oliff & Berridge

[57] ABSTRACT

Disclosed is a brake fluid pressure control apparatus in which an anti-lock control mechanism is connected to a hydraulic booster. A large-diameter piston is combined with a small-diameter piston so that the pressurization effected by the master cylinder M/C can be augmented by virtue of the difference in diameter between these pistons before it is transmitted to the wheel cylinder W/C. By moving forwards, the pistons cause a fluid supply passage between the fluid pressure source and a wheel cylinder W/C to be opened. With this structure, the size and weight of a brake fluid pressure control apparatus can be reduced.

3 Claims, 1 Drawing Sheet

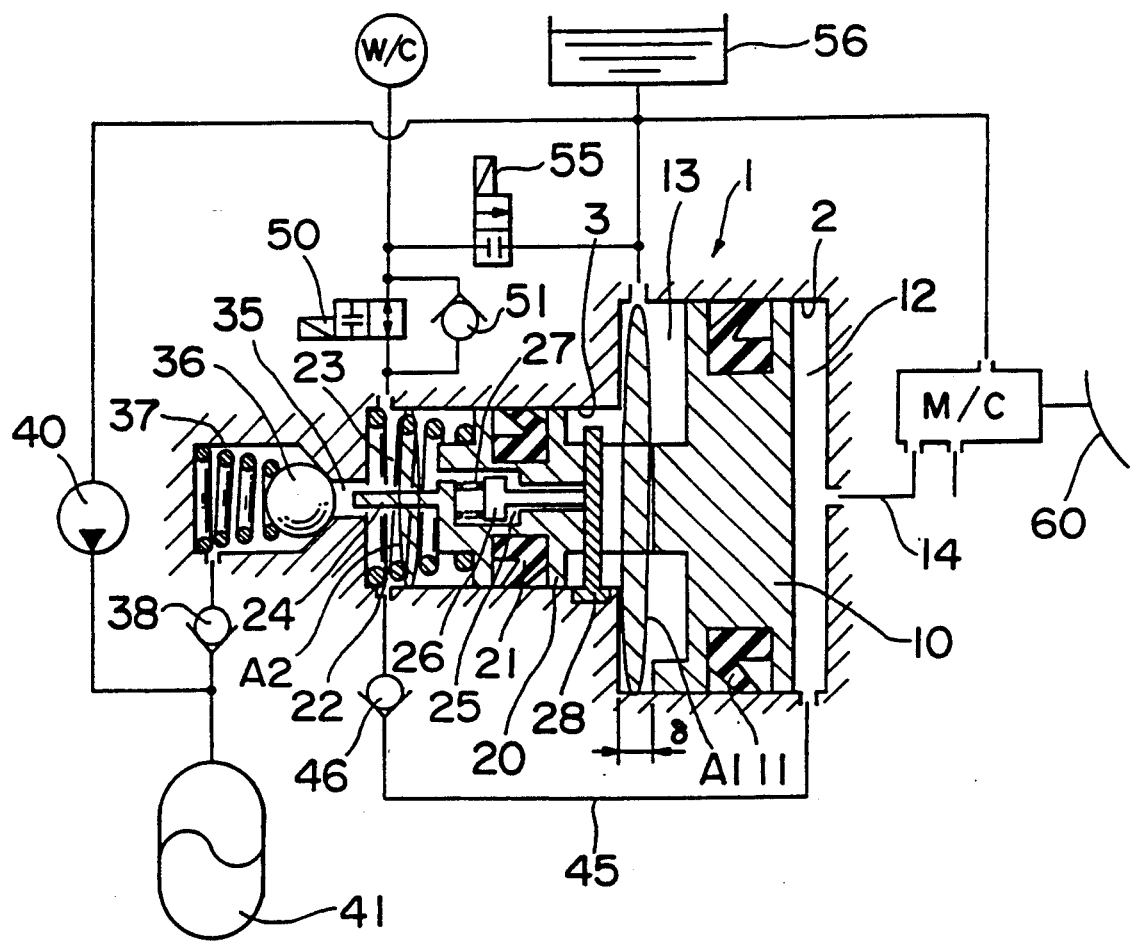

BRAKE FLUID PRESSURE CONTROL APPARATUS

BACKGROUND OF THE INVENTION

This invention relates to a brake fluid pressure control apparatus in a vehicle brake system of the type in which an anti-lock control mechanism is connected to a hydraulic booster.

The structure of a brake fluid pressure control apparatus of this type is shown in U.S. Pat. No. 4,750,289, U.S. Pat. No. 4,802,713, Japanese Laid-Open Patent No. 59-137242, Japanese Laid-Open Patent No. 61-77553, etc.

The apparatuses disclosed in the above-mentioned publications have the following structure: the rear end of a hydraulic brake booster is connected to the front end of a push rod of a brake pedal, and a master cylinder is connected to the front end of this hydraulic brake booster. The fluid chamber of this master cylinder is connected through a hold valve consisting of a normally-open type electromagnetic valve to a wheel cylinder. The wheel cylinder is connected to a reservoir through a decay valve consisting of a normally-closed type electromagnetic valve. Thus, the master cylinder is arranged on the downstream side of the brake booster.

The problem with the above conventional brake fluid pressure control apparatus is that the hydraulic brake booster and the master cylinder are connected in series to each other, resulting in the entire length of the apparatus being excessively large. Further, since the above-described connection in series also involves an increase in weight, a special reinforcement must be provided on the wheel side before this brake fluid pressure control apparatus can be mounted, for example, on the fire wall of the vehicle.

SUMMARY OF THE INVENTION

This invention has been made in view of the above. It is accordingly an object of this invention to provide a brake fluid pressure control apparatus which is small and lightweight and which can be installed without it becoming a burden to the section on which it is mounted, such as the fire wall.

In accordance with this invention, there is provided a brake fluid pressure control apparatus in a vehicle brake system, comprising: a housing consisting of a large-diameter section and a small-diameter section; a pair of pistons consisting of a large-diameter piston and a small-diameter piston which is connected to the large-diameter piston, both being fitted into the housing, the large-diameter piston being lodged in the large-diameter section, the small-diameter piston being lodged in the small-diameter section; a pressurizing chamber provided in the above-mentioned large-diameter section on the side of the large-diameter piston situated farther from the small-diameter section and connected to a master cylinder M/C of the vehicle brake system; a fluid pressure chamber provided in the small-diameter section and connected to a wheel cylinder W/C of the vehicle brake system; a fluid supply passage connecting the fluid pressure chamber to a fluid pressure source of the vehicle brake system; and a normally-closed type check valve provided in the above-mentioned fluid supply passage; the large-diameter piston and the small-diameter piston being moved toward the fluid supply passage by a pressure rise in the pressurizing chamber caused by the master cylinder M/C, thereby opening the above-mentioned check valve and transmitting the pressure fluid from the fluid pressure source to the wheel cylinder W/C through the fluid supply passage and the fluid pressure chamber.

When, with the above structure, the normal brake function can be obtained, a pressure rise in the pressurizing chamber, caused by pressing on the brake pedal, causes the large-diameter piston to make a forward movement. This causes the small-diameter piston connected thereto to advance in such a manner as to compress the fluid pressure chamber. Thus, the pressure fluid in this fluid pressure chamber is supplied to the wheel cylinder W/C, thereby braking the vehicle. In this process, the pressure in the fluid pressure chamber is augmented in accordance with the ratio of the diameter of the large-diameter piston to that of the small-diameter piston. Further, the forward movement of the small-diameter piston causes the check valve in the fluid supply passage to be opened, thereby allowing the pressure fluid of the fluid pressure source to be transmitted to the wheel cylinder W/C by way of the fluid pressure chamber. This makes it possible to attain a high boost effect.

If, during the above vehicle braking process, the wheels threaten to get locked, the fluid passage between the fluid pressure chamber and the wheel cylinder W/C is cut appropriately, thus keeping or venting the pressure in the wheel cylinder W/C as needed.

If it is necessary to re-pressurize the wheel cylinder W/C, the valve device is opened to connect the fluid pressure chamber to the wheel cylinder W/C again. Since, in this process, the check valve is held open on account of the above operation, the pressure fluid of the fluid pressure source is transmitted through the fluid supply passage and the fluid pressure chamber to the wheel cylinder W/C, thereby effecting the re-pressurization thereof.

Thus, in accordance with this invention, a brake fluid pressure control apparatus having the function of a hydraulic booster is arranged on the downstream side of the master cylinder M/C, so that it is not necessary to integrally connect a hydraulic booster to the master cylinder M/C, as in the prior art. Thus, the brake fluid pressure control apparatus and the master cylinder M/C can be formed separately, as they are connected to each other solely through a fluid passage. As a result, the apparatus length can be substantially reduced. Furthermore, since the apparatus is not formed integrally with the master cylinder M/C, weight dispersion can be effected, and thus the burden to the section on which the apparatus is mounted is reduced. Thus, a small-sized apparatus which can be mounted on a vehicle and an improved degree of installation flexibility is obtained.

In addition, since the opening of the check valve in the fluid supply passage is effected through the movement of the small-diameter piston, the opening and closing of the fluid supply passage connected to the fluid pressure source can be performed with a very simple structure, which leads to a reduction in both the size of the anti-lock control mechanism and its cost.

BRIEF DESCRIPTION OF THE DRAWINGS

The single figure is a diagram showing a brake fluid pressure control apparatus in accordance with an embodiment of this invention, of the type in which an anti-lock control apparatus is connected to a hydraulic booster.

DESCRIPTION OF THE PREFERRED EMBODIMENT

In the embodiment shown, a large-diameter piston 10 is fitted into a large-diameter section 2 of a housing 1, and, at the same time, a small-diameter piston 20, which is integrally connected to the large-diameter piston 10, is fitted into a small-diameter section 3 of the housing 1.

A large-diameter seal ring 11 is fitted around the large-diameter piston 10, and a small-diameter seal ring 21 is fitted around the small-diameter piston 20, thereby maintaining fluidtightness between the pistons and the Inner peripheral surface of the housing. The small-diameter piston 20 is normally biased toward the large-diameter piston 10 by a piston press spring 22. The front end surface of the small-diameter piston 20 defines, together with the inner surface of the housing 1, a fluid pressure chamber 23. A push rod 24 protrudes from the front end surface of the small-diameter piston 20 into this fluid pressure chamber 23. Provided in the small-diameter piston 20 is a communicating passage 25 through which the fluid pressure chamber 23 communicates with a back chamber 13 defined by the front end surface of the large-diameter piston 10 and the inner surface of the housing 1. Provided in this communicating passage 25 is a second check valve 26 which is biased by a second spring 27. This second check valve 26 is closed by the small-diameter piston 20 when it moves to its forward stroke end. When the small-diameter piston 20 has retreated to its rear stroke end, the rear end of the second check valve 26 abuts against a stopper pin 28 which protrudes from the housing 1 substantially at right angles with respect to the longitudinal axis of the housing 1. Thus, a further retreat of the second check valve 26 and the small-diameter piston 20 is prevented. When the small-diameter piston 20 and the second check valve 26 are in this position, the communicating passage 25 is open.

A pressurizing chamber 12 is formed in the large-diameter section 2, on the side of the rear end surface of the large-diameter piston 10. This pressurizing chamber 12 is connected through a fluid passage 14 to a master cylinder M/C of the vehicle brake system. The above-mentioned fluid pressure chamber 23 in the small-diameter section 3 is connected through a fluid supply passage 35 provided in the housing 1 to a fluid pressure source 40 consisting for example, of a pump. Provided in this fluid supply passage 35 is a first check valve 36 which is biased by a first spring 37 in such a manner as to close the orifice of this fluid supply passage 35. This first check valve 36 is opened by the push rod 24 against the biasing force of the first spring 37 when the small-diameter piston 20 advances toward the fluid supply passage 35. When the small-diameter piston 20 retreats, the first check valve 36 is closed, and, at the same time, the volume of the fluid pressure chamber 23 increases.

Provided between the first check valve 36 and the fluid pressure source 40 is a third check valve 38 for preventing backward flow of the pressure fluid, and, provided between the third check valve 38 and the fluid pressure source 40 is an accumulator 41 which serves as a pressure accumulating means. The in-take side of the fluid pressure source 40 is connected to a reservoir 56.

The fluid pressure chamber 23 is connected through a hold valve 50 to a wheel cylinder W/C of the vehicle brake system. Provided in the fluid passage connecting the fluid pressure chamber 23 to the wheel cylinder W/C is a bypass which runs around the hold valve 50. Provided in this bypass is a fifth check valve 51 allowing the fluid to flow from the wheel cylinder W/C back to the fluid pressure chamber 23. The wheel cylinder W/C is connected to the reservoir 56 through a decay valve 55.

The back chamber 13, defined by a step section of the two pistons 10, 20 and the inner surface of the housing 1, is connected to the reservoir 56. The volume of this back chamber 13 decreases when the large-diameter piston 10 moves toward the fluid pressure chamber 23 and increases when it moves away from the fluid pressure chamber 23.

The pressurizing chamber 12 is connected to the fluid pressure chamber 23 through a passage 45. Provided in this passage 45 is a fourth check valve 46 which only permits the fluid to flow from the pressurizing chamber 12 to the fluid pressure chamber 23.

In this embodiment, a pressurization of the master cylinder M/C, caused by pressing on a brake pedal 60, causes the pressure fluid of the master cylinder M/C to flow into the pressurizing chamber 12, thereby raising the pressure in this pressurizing chamber. As a result, the large-diameter piston 10 and the small-diameter piston 20 move toward the fluid pressure chamber 23. In this process, the second check valve 26 closes the communicating passage 25, the small-diameter piston 20 pressurizing the fluid pressure chamber 23. In this pressurization, the pressure from the pressurizing chamber 12 is augmented in the fluid pressure chamber 23 in accordance with the ratio of the diameter of the large-diameter piston 10 to that of the small-diameter piston 20 before being transmitted to the wheel cylinder W/C. This pressure augmentation will be described below in more detail:

Supposing the cross-sectional area of the large-diameter piston 10 is A1, the cross-sectional area of the small-diameter piston 20 is A2, the force of the spring 22 is F, the pressure in the pressurizing chamber 12 (the output pressure of the master cylinder M/C) is P1, and the pressure in the fluid pressure chamber 23 is P2, the following balance equation is established:

$$P2 \times A2 + F = P1 \times A1$$

Therefore $P2 = (A1/A2) \times P1 - F/A2$

Thus, it is ascertained that the pressure P2 in the fluid pressure chamber 23 is proportionally augmented with respect to the pressure P1 in the pressurizing chamber 12. In this way, a boost effect can be obtained in accordance with the ratio between the piston diameters.

When the small-diameter piston 20 further advances, the push rod 24 passes through the fluid supply passage 35 and is pressed against the first check valve 36, thereby opening the fluid supply passage 35, which has been closed until then. The factors determining the opening/closing control of the first check valve 36 are the pressure in the fluid pressure chamber 23, the back pressure of the check valve 36, and the biasing force of the first spring 37. When the fluid supply passage 35 is thus opened, the pressure fluid accumulated in the accumulator 41 by the fluid pressure source 40 is transmitted through the third check valve 38, the fluid supply passage 35, the fluid pressure chamber 23, the hold valve 50, and the wheel cylinder W/C.

If, during this braking operation, it is judged by a control section (not shown) that there is a threat that the wheels will get locked, the following anti-lock control is effected.

First, in order to prevent the wheels from getting locked, the hold valve 50 is operated to cut the connection between the fluid pressure chamber 23 and the wheel cylinder W/C, thereby stopping the pressurization in the wheel cylinder W/C. The decay valve 55 is then operated to reduce the pressure in the wheel cylinder W/C. If it is desired that the internal pressure of the wheel cylinder be kept as it is, the operation of the decay valve 55 is stopped, thereby keeping the pressure. If it is necessary to repressurize the wheel cylinder W/C, the hold valve 50 is opened again. This causes the pressure fluid of the fluid pressure source 40 to be transmitted to the wheel cylinder W/C again, thus resuming the braking operation.

If, during the above operation, the fluid pressure source 40 should malfunction, the following operation is performed:

When power failure occurs as a result of the malfunction of the fluid pressure source 40, the check valve 36 loses its back pressure, so that the small-diameter piston 20 advances further. The gap δ between the front end surface of the large-diameter section 2 of the housing 1 and the front end surface of the large-diameter piston 10 is then lost, and the forward movement of the small-diameter piston 20 is stopped. When the pressure of the master cylinder M/C has become higher than that of the wheel cylinder W/C, the pressure fluid of the master cylinder MC passes through the pressurizing chamber 12 and the passage 45, opening the fourth check valve 46 and flowing into the fluid pressure chamber 23. The third check valve 38 prevents the pressure fluid in the fluid pressure chamber 23 from flowing back to the side of the fluid pressure source 40, and the pressure fluid of the master cylinder M/C is supplied to the wheel cylinder W/C only. Thus, even when the fluid pressure source 40 malfunctions, the normal braking function is secured by the passage 45, the check valves 46, 38, etc.

If a wheel cylinder W/C malfunctions, a pressurized state is not generated even if the pressure in the pressurizing chamber 12 is raised by the master cylinder M/C and the small-diameter piston 20 makes a forward movement. In this case, the pressure fluid in the pressurizing chamber 12 flows into the passage 45 and opens the fourth check valve 46, the pressure fluid of the fluid chamber of the master cylinder M/C of that system continuing to be supplied until the master cylinder M/C attains a full stroke condition. During this process, the first check valve 36 is kept in the closed state since the high pressure of the fluid pressure source 40 acts as the back pressure. The wheel cylinders W/C of the other systems operate in the normal fashion. Thus, in the case where a wheel cylinder W/C malfunctions, the fluid pressure from the fluid pressure source 40 is prevented by the first check valve 36 from being transmitted to the wheel cylinder W/C, thus avoiding brake fluid wastage.

While a preferred embodiment has been described above, it should be understood that the present invention is not restricted thereto but may be otherwise variously modified. For instance, Instead of integrally forming the hydraulic booster and the anti-lock control apparatus and separately forming the master cylinder M/C, the anti-lock control apparatus may be formed integrally with the master cylinder by arranging them in a parallel fashion.

What is claimed is:

1. A brake fluid pressure control apparatus in a vehicle brake system comprising:
   a housing consisting of a large-diameter section and a small-diameter section;
   a large-diameter piston and a small diameter piston which is connected to said large-diameter piston, both being fitted into said housing, said large-diameter piston and said small-diameter piston being slidably engaged in said large-diameter section and small-diameter section, respectively;
   a first seal provided between the large-diameter section and a periphery of the large-diameter piston and a second seal between the small-diameter section and a periphery of the small-diameter piston;
   a pressurizing chamber which is provided in said large-diameter section on the side of said large-diameter piston situated further from said small-diameter section and which is connected to a master cylinder M/C of said vehicle brake system;
   a fluid pressure chamber provided in said small-diameter section and connected to a wheel cylinder W/C of said vehicle brake system;
   a fluid supply passage connecting said fluid pressure chamber to a fluid pressure source of said vehicle brake system;
   a first nominally-closed type check valve provided in said fluid supply passage and adapted to be opened by the movement of said small-diameter piston;
   a step section of said large-diameter and small-diameter pistons defining, together with said housing, a back chamber which is connected to a reservoir for receiving brake fluid;
   a normally-closed type decay valve provided in the fluid passage connecting said wheel cylinder W/C to said reservoir; and
   a hold valve provided in the fluid passage connecting said fluid pressure chamber to said wheel cylinder W/C;
   said large-diameter piston and said small-cylinder piston being moved toward said fluid supply passage by a pressure rise in said pressurizing chamber that is caused by said master cylinder M/C, thereby opening said check valve and transmitting the pressure fluid from said fluid pressure source through said fluid pressure chamber to said wheel cylinder W/C, and said hold valve is closed and said decay valve is opened when the pressure in the wheel cylinder W/C is decreased to prevent the wheels from becoming locked.

2. An apparatus as claimed in claim 1, wherein said fluid pressure chamber and said pressurizing chamber are connected to each other through a passage having a second check valve which only allows the fluid to flow from said pressurizing chamber to said fluid to flow from said pressurizing chamber to said fluid pressure chamber.

3. An apparatus as claimed in claim 2, further comprising a communicating passage provided within said small-diameter piston and serving to connect said back chamber to said fluid pressure chamber, and a third check valve closed when said small-diameter piston moves to its stroke end on the side of said fluid pressure chamber and to be opened when said small-diameter piston moves away from said stroke end.

* * * * *